Aug. 14, 1962 W. A. HUNT 3,049,692

ERROR DETECTION CIRCUIT

Filed July 15, 1957

INVENTOR.
WARREN A. HUNT

BY [signature]

ATTORNEY

United States Patent Office 3,049,692 Patented Aug. 14, 1962

3,049,692

ERROR DETECTION CIRCUIT

Warren A. Hunt, Poughkeepsie, N.Y., assignor to International Business Machines Corporation, New York, N.Y., a corporation of New York Filed July 15, 1957, Ser. No. 671,945
2 Claims. (Cl. 340—146.1)

This invention relates to computers in general, and more particularly to a self-checking circuit to be incorporated in such computers in order to automatically determine whether the information residing in a memory address register has been properly translated so as to select the proper drive lines of the "memory" portion of the computer.

In many core memory arrays utilizing bistable cores having substantially square hysteresis loop characteristics as the storage elements, a bit of information is selected for reading or writing by simultaneously driving a particular X-line of cores and a particular Y-line of cores of a magnetic memory core matrix. The particular core that lies at the intersection of the two selected driver lines will be driven to a desired state during read-in or write instruction. All other cores that are actuated by only a single driver, either an X-driver or Y-driver, will not be affected because the driving current of each driver alone is not sufficient to switch a core. When a particular core in the memory matrix is to be sensed or read-out, simultaneous sensing current pulses are sent through the X-driver line and Y-driver line, such sensing current pulses being of a polarity opposite to the current pulses employed for writing. The core that lies at the intersection of two sensing current pulses will be driven from one remanent state to its opposite remanent state, whereas the stable states of those cores that are driven by only a single sensing current pulse remain unchanged. As is well-known to those skilled in the art, output windings thread all the cores in the memory array so that changes in state of a core can be detected as voltage pulses induced in such output windings. Where desired, inhibit windings may also thread all the cores in the array so that the presence of a current pulse in said inhibit windings will prevent the change of state of a core despite the coincidence of an X-driver current pulse and a Y-driver pulse in two separate windings threading such core.

The aforementioned selection of a bit by coincident pulsing can be extended to select a word comprising a plurality of bits. The X-driver winding will thread a plurality of planar arrays of cores and the Y-driver winding will thread the same plurality of planar arrays of cores. The intersection of a particular X-plane and a particular Y-plane will be a line of cores, such line of cores representing a series of bits, or a word. Inhibition and read-out of a three dimensional magnetic core matrix are carried out in a manner similar to the inhibition and read-out of a two dimensional core matrix array.

In the instant checking system, an X-driver or Y-driver selected during read-out of a core memory is represented initially in a memory address register by a certain number of bits. The bits, when converted to two single line current pulses, will cause certain parallel X-planes of cores and certain parallel Y-planes of cores to be actuated. The intersection of such selected X and Y planes will form a plurality of bits or a word. If additional cores are attached or coupled to the X and Y driver lines noted above, the additional cores are switched and assume, in coded form, the original address of the selected X-driver and Y-driver. This address assumed by the additional cores is compared in a suitable comparison circuit with the original address of the memory register to check for errors; the failure of the assumed address in the additional cores to jibe with the original address of the memory register will yield a signal in an output circuit coupled to such comparison circuit, and an alarm or appropriate indicating device will become operative.

Consequently it is an object of this invention to employ a novel self-checking circuit in a computing device.

It is further object to employ a self-checking circuit for a computer utilizing components in the checking circuit that are highly compatible with the storage elements and accompanying circuitry of such computer.

It is yet another object to provide a self-checking circuit for a computer that is simple in its concept and application yet highly reliable in operation.

Other objects of the invention will be pointed out in the following description and claims and illustrated in the accompanying drawings which disclose, by way of example, the principle of the invention, and the best mode which has been contemplated of applying that principle.

Figure 1:
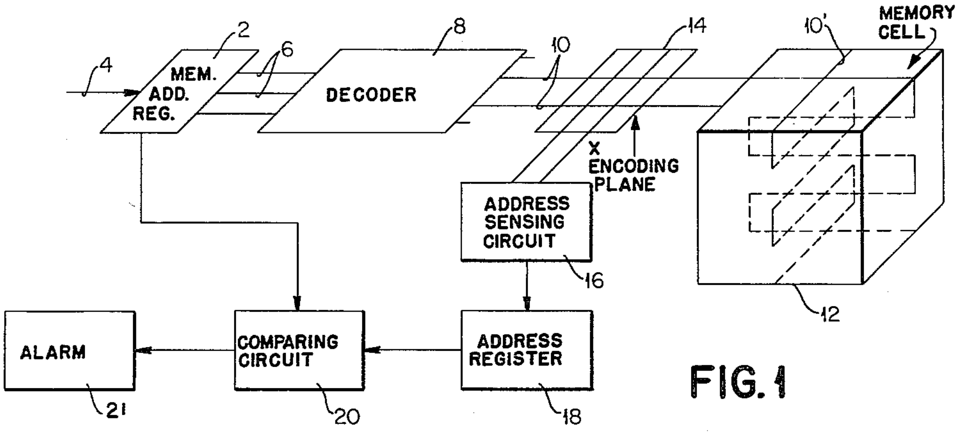
FIG. 1 is a representation of the invention in block form.

Referring to FIG. 1 there is shown a memory address register 2 to which has been sent error-free information via input line 4. Such memory address register is of a well-known type wherein address selection of a memory element or bit is obtained by coincident current, flux, voltage, etc. applied to the memory element, and such memory element could be a magnetic core having substantially square hysteresis loop characteristics, a metallic film, a relay, a ferroelectric device, or any other element that can assume two stable states. For the purpose of illustrating the instant invention, magnetic cores and coincident current drive lines coupled to such cores for switching the latter from one stable state to another will be employed, although it is understood that the invention is no necessarily restricted to the structure chosen for such illustration.

The address storage information, being in coded form, is read out of the address register 2 and is transmitted along transfer circuits, represented as line 6, to a decoding and driving circuit 8 for converting the coded signal received from the address register 2 into a single signal pulse that is carried along a conductor or transfer circuit, represented as line 10, to actuate a preselected group of cores that lie in parallel planes in memory cell block 12. However, additional cores are placed in fixed configuration, to be described hereinafter, along such conductors 10 and lie in a plane 14, called the X encoding plane, in that its function is to invert the decoder signals appearing in conductors 10 and duplicate the original address in the address register 2. Block 16 symbolizes a means for sensing the address of the X encode plane 14 and block 18 represents an address register which may be similar in operation to the memory address register 2. The address of register 2 is compared with the address of register 18 in a comparing circuit 20, said comparing circuit being adapted to make a bit by bit comparison of the address of the original register 2 and the address produced in the encoding plane 14 and transmitted by sensing means 16 to register 18. When there is a mismatch of the two registers, an output signal from compare section 20 actuates an alarm 21 or appropriate indicating device, or may be used to actuate an error-correcting circuit.

It is understood that FIG. 1 merely illustrates the selection, storage, and comparison of an X address, such X address selecting cores lying in planes along the X-coordinate of a cartesian array of cores. A grouping of devices and circuits similar to blocks 2, 6, 8, 10, 12, 16, 18 and 20 are provided for those cores that lie in planes along the Y-coordinate of such cartesian array of cores. Hence the Y encode plane, not shown, would actuate additional cores that are placed in a fixed configuration along Y driver lines 10′, similar to the additional cores that are placed in a fixed configuration along X driver lines. The magnetic storage block 12 would store the Y address in preselected cores that lie in a Y plane, perpendicular to the X planes of cores in such block 12. The intersection of the selected X plane and selected Y plane would be a line of cores representing a word or a plurality of bits. The aforementioned discussion relates to memory address registers, decoders, and three-dimensional magnetic memory storage blocks that are well-known in the art and which do not constitute the present invention.

Such well-known components are more specifically shown and described in a copending application for a "Transformer Matrix System" by F. R. Durgin et al., Serial No. 431,164, filed as a U.S. patent application on May 20, 1954, and assigned to the same assignee as that of the instant application, as well as in a U.S. patent application, Serial No. 471,002, for "Electronic Data Processing Machine," by Ross et al. as filed on November 24, 1954, and now abandoned.

Figure 2:
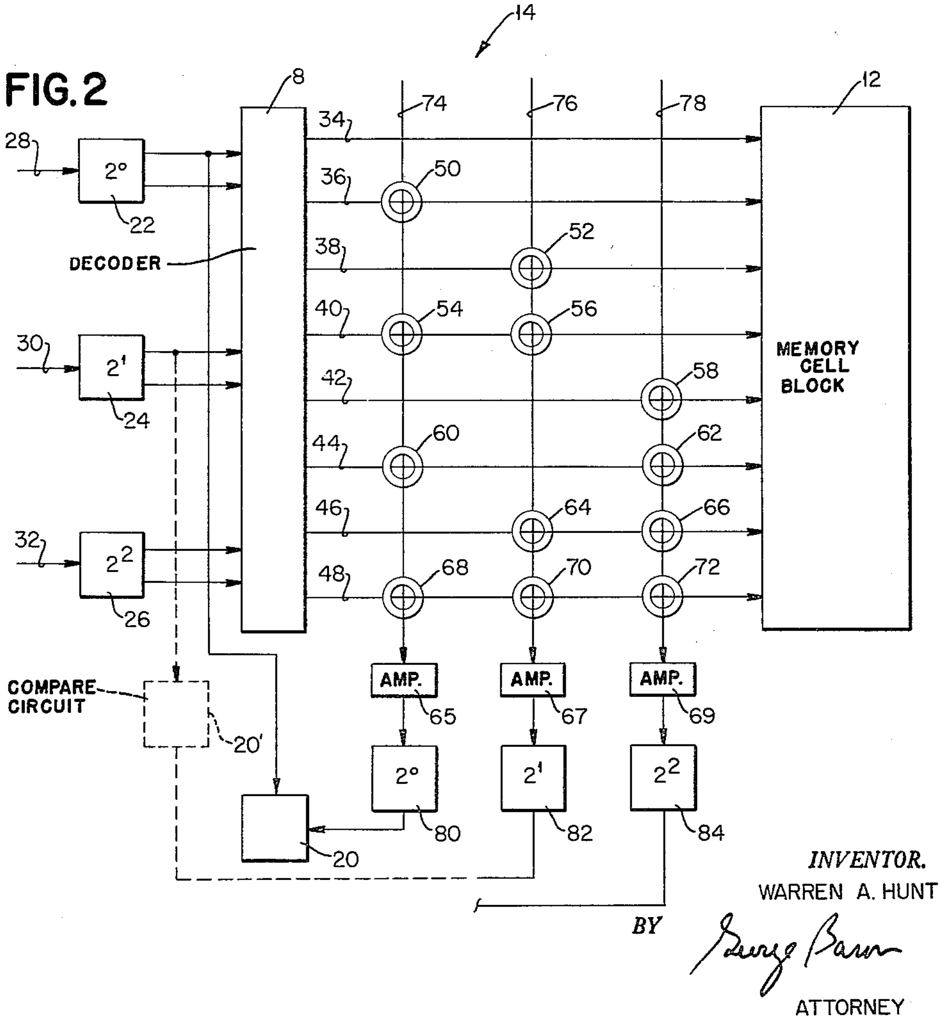
FIG. 2 is an embodiment of the invention wherein the checking circuit forming the invention comprises bistable magnetic elements and its accompanying circuitry.

Turning to FIG. 2, the invention is shown in greater detail. The memory address register 2 will comprise a plurality of bistable elements 22, 24 and 26 for storing an instruction or command in binary form. The bistable elements 22–26 are flip-flops wherein inputs applied to them from their respective input leads 28, 30 and 32 will set their respective flip-flops to the "1" state whereas the absence of a pulse in an input lead will leave its corresponding flip-flop in the "0" state. Flip-flops 22–26 are shown as the type wherein a set pulse of one polarity applied to an input, such as input 28, will set its corresponding flip-flop 22 to its "1" state. A reset pulse of the opposite polarity, applied to input 28, will reset the flip-flop 22 to its "0" state. Consequently the three flip-flops 22–26 may assume any binary combination of 0's and 1's from 000 to 111, depending upon whether such flip-flops are set to their "0" or "1" states by signals appearing at inputs 28–32. The decoder 8 receives the coded information in binary form from flip-flops 22–26 and converts such coded information to a single X-selection line 34 through 48 for the cores in memory block 12. For example, if flip-flops 22–26 are in their respective 1, 0, 1 states, indicating the address 101 or the number 5 in decimal notation, decoder 8 will convert the binary address 101 into a single address that will be evidenced as a signal pulse carried by the output line 44 of the decoder 8. Output line 44 will thread all the cores that lie in one line of the first plane of the memory array 12, all the cores that lie in a second plane in a line corresponding to that of the first plane, continuing on upward through as many planes as there are bits in the word to be stored in such memory array 12.

The description of FIG. 2 thus far relates to the environmental aspects of the invention. The gist of the invention comprises the locating of bistable magnetic cores, such as cores 50 through 72, along selection lines 34 through 48, wherein such cores are made to assume preselected stable magnetic remanent states whenever their corresponding selection lines are transmitting a current pulse to actuate the cores in memory array 12. Consequently when line 36 is "up" or conducting and the remaining selection lines are "down" or non-conducting, core 50 is driven to a predetermined state. Similarly, when selection line 44 is up, cores 60 and 62 are each driven to the same predetermined state. Windings 74, 76, and 78 are sense windings that thread all the cores that lie in the same column of the encode plane 14. As can be seen in the drawing, sense winding 74 threads cores 50, 54, 60 and 68, sense winding 76 threads cores 52, 56, 64 and 70, whereas sense winding 78 threads cores 58, 62, 66 and 72.

Connected to each sense winding is a sense amplifier, sense amplifier 65 being associated with sense winding 74, sense amplifier 67 being coupled to sense winding 76, and sense amplifier 69 being coupled to sense winding 78. Each of the amplifiers 65, 67 and 69 has the property of producing an output pulse whenever an input pulse is applied to its input terminal regardless of the polarity of such input pulse. The output of each sense winding is fed into a flip-flop, flip-flop 80 being associated with sense amplifier 65, flip-flop 82 with sense amplifier 67, and flip-flop 84 with sense amplifier 69. Flip-flops 80, 82 and 84 are in effect another register, the contents of which can be compared with the contents of the memory address register 2 through suitable comparison circuits. Blocks 20 and 20′ represent such comparison circuits for the $2^0$ and $2^1$ orders, respectively.

It is understood that although the described address register 2 displays only three flip-flops 22, 24 and 26, a practical device might have six such flip-flops in the X register and six flip-flops in the Y address register. The memory array, illustrated as an 8×8 array of cores, would comprise 64 bits in the X direction and 64 bits in the Y direction, or a planar array of 4096 cores. There may also be 64 such planar arrays of 4096 cores. When the number of order of flip-flops in the address register 2 is increased, there will have to be a corresponding increase in the number of sense windings and cores in the X encode and Y encode planes as well as an increase in the number of sense amplifiers and flip-flops coupled to such X and Y encode planes.

The comparison circuit 20 may be any of the well known types that compare two equal ordered registers, such comparison being made by comparing the binary state of flip-flop 22 with the binary state of flip-flop 80, the state of flip-flop 24 with that of flip-flop 82, etc. A similar comparison must be made between the contents of the Y address register and the register created by the contents of the Y encode plane, not shown. If the comparison shows no error, then all the cores in the encode planes and flip-flops in the register are reset to their "0" states, and the address register 2 may be filled with another instruction, permitting the hereinabove cycle to recommence.

If desired, the cores 50, 52, 54, etc. need not be inserted along the select lines 34 through 48 that couple the decoder 8 with the memory array 12. Such additional cores can be added as additional planes in the Z dimension of the memory array. For example, if there are eight planes of cores in the memory array 12 along the Z axis of the memory array, the additional cores may be added as three more planes of cores to the eight planes forming the memory array 12. Such additional planes, although requiring more cores than is shown in the encode plane 14 of FIG. 2, have the advantage of not requiring modification of the conventional equipment accompanying decoder 8 and memory array 12. The addition of planes of cores as encode planes to the planar array of cores in the memory array 12 would be a relatively simple change, in harmony with existing core memory devices.

What is claimed is:

1. An error detector circuit comprising an address register having $n$ orders of bistable elements, means for setting each of said bistable elements into either of its two stable states to form a coded instruction providing first binary combinations on $2^n$ outputs, a decoder having inputs electrically coupled from the outputs of said register and said decoder having $2^n$ output selector lines, each selector line corresponding to and becoming energized by different combinations of stable states of said elements in said address register, bistable magnetic cores connected to said decoder selector lines wherein each selector line affects a different combination of cores, and further means responsive to the selected magnetic cores to form a reconverter array of second binary combinations to place the decoder back into the same binary code as was directed from the memory address register, a second register of bistable elements for storing such reconverted code, and means coupled to outputs from said second register and the outputs from said address register comparing the equality of said two registers.

2. An error detector circuit comprising an address register having $n$ orders of bistable elements, means for setting each of said bistable elements into either of its two stable states to form a coded instruction, a decoder having inputs electrically coupled from said outputs of said register and having $2^n$ output selector lines, each selector line corresponding to and becoming energized by one of a plurality of combinations of stable states of said elements in said address register to deliver a signal pulse to a utilization circuit, bistable magnetic cores disposed in a code converting pattern along each selector line and each core adapted to assume a bistable state in response to such energization corresponding to the code of the coded instruction of said address register, a second register having $n$ orders of bistable elements, means for sensing the assumed states of such cores and transmitting such conditions to said second register of bistable elements, and means coupled to outputs from said second register and the outputs from said address register comparing the equality of the contents of both registers.

References Cited in the file of this patent

UNITED STATES PATENTS

| | | |
|---|---|---|
| 2,641,696 | Woolard | June 9, 1953 |
| 2,682,573 | Hunt | June 29, 1954 |
| 2,821,696 | Shiowitz et al. | Jan. 28, 1958 |
| 2,857,100 | Franck et al. | Oct. 21, 1958 |
| 2,871,289 | Cox et al. | Jan. 27, 1959 |
| 2,904,781 | Katz | Sept. 15, 1959 |